US012508813B2

(12) United States Patent
Romero et al.

(10) Patent No.: US 12,508,813 B2
(45) Date of Patent: Dec. 30, 2025

(54) INK CARTRIDGE RECEIVING MODULE

(71) Applicant: BOBST MEX SA, Mex (CH)

(72) Inventors: José-Manuel Romero, Bussigny (CH); William Watson, Bollion (CH); Rodolph Laurent, Vufflens-la-Ville (CH)

(73) Assignee: BOBST MEX SA, Mex (CH)

(*) Notice: Subject to any disclaimer, the term of this patent is extended or adjusted under 35 U.S.C. 154(b) by 169 days.

(21) Appl. No.: 18/453,568

(22) Filed: Aug. 22, 2023

(65) Prior Publication Data

US 2024/0066879 A1 Feb. 29, 2024

(30) Foreign Application Priority Data

Aug. 23, 2022 (EP) .................................... 22191609

(51) Int. Cl.
*B41J 2/175* (2006.01)
*B41J 2/17* (2006.01)

(52) U.S. Cl.
CPC ......... *B41J 2/17523* (2013.01); *B41J 2/1721* (2013.01); *B41J 2/17553* (2013.01); *B41J 2/17566* (2013.01); *B41J 2/1742* (2024.05)

(58) Field of Classification Search
CPC .. B41J 2/17523; B41J 2/1721; B41J 2/17553; B41J 2/17566; B41J 2/1742; B41J 2/17513; B41J 2/1752; B41J 2/17546; B41J 2/16508; B41J 2/175; B41J 2/17503; B41J 2/17506; B41J 2002/17573
USPC ............................................................ 347/86
See application file for complete search history.

(56) References Cited

U.S. PATENT DOCUMENTS

| | | | | |
|---|---|---|---|---|
| 4,878,069 | A * | 10/1989 | Kiyohara | B41J 2/175 347/22 |
| 6,209,996 | B1 * | 4/2001 | Gasvoda | B41J 2/1752 347/86 |
| 2005/0068364 | A1 * | 3/2005 | Kayanaka | B41J 2/165 347/23 |
| 2008/0180484 | A1 * | 7/2008 | Kulpa | B41J 2/185 347/35 |
| 2008/0239027 | A1 * | 10/2008 | Kinase | B41J 2/175 347/85 |
| 2013/0155157 | A1 | 6/2013 | Harvey et al. | |
| 2016/0200114 | A1 | 7/2016 | Nanjo et al. | |
| 2018/0311962 | A1 * | 11/2018 | White | B41J 2/17566 |
| 2019/0193422 | A1 | 6/2019 | Ferrari et al. | |

FOREIGN PATENT DOCUMENTS

| | | | |
|---|---|---|---|
| CN | 102717601 | A | 10/2012 |
| EP | 2883708 | A | 6/2015 |
| EP | 2883708 | A2 | 6/2015 |

(Continued)

*Primary Examiner* — Jason S Uhlenhake
*Assistant Examiner* — Alexander D Shenderov
(74) *Attorney, Agent, or Firm* — Bookoff McAndrews, PLLC

(57) ABSTRACT

An ink cartridge receiving module having a plurality of receiving spaces (14) for receiving a plurality of ink cartridges (20), each receiving space (14) having a bottom surface (22) which is inclined at an angle between 10° and 45° with respect to a horizontal plane, each receiving space (14) further having a connector (30) adapted for removing ink from the respective cartridge (20), the connectors (30) being arranged at the lower side of the receiving spaces (14).

15 Claims, 14 Drawing Sheets

(56) References Cited

FOREIGN PATENT DOCUMENTS

| | | | |
|---|---|---|---|
| WO | 2014000634 | A1 | 1/2014 |
| WO | 2015126065 | A1 | 8/2015 |
| WO | 2018200152 | A1 | 11/2018 |
| WO | 2020013832 | A1 | 1/2020 |

* cited by examiner

INK CARTRIDGE RECEIVING MODULE

CROSS-REFERENCE TO RELATED APPLICATION(S)

This patent application claims the benefit of priority to European Application No. 22191609.1, filed on Aug. 23, 2022, the entirety of which is incorporated herein by reference.

Industrial printers have a high demand for ink, which leads to the use of large ink cartridges for printers in this scope of application, which can be in the range of about 5 to 25 liters and preferably about 10 liters. Hereby, the volume of the ink cartridge and thus the amount of ink they contain determines how frequently the ink cartridge is empty during the printing process and needs to be exchanged.

In order to make an ink cartridge last as long as possible, in the industry ink cartridges are typically in the form of canisters to maximize the amount of ink in one cartridge.

According to the current state of the art, shelves are provided to accommodate the cartridges in which the canisters are placed to stand upright. Therefore, the opening of the cartridges points upwards so that a lid with a suction tube for the ink and a tube for bleeding can be attached to the opening of the canister. Further, a spring clip is usually provided on the lid so that the lid has a tight fit in the opening of the canister.

The disadvantage is that when the lid is removed, it often happens that ink is spilled from the lid especially from the suction tube of the lid. This can lead over time to many spills which must be continuously removed. In addition, this kind of setup does not allow removing the ink fully out of the cartridge. This is at one hand due to the geometry of the bottom surface of canisters, manufacturing tolerances and also because of the suction tube itself, which extracts ink only until a certain level. On the other hand, to avoid that air is sucked into the print head, usually the ink is not completely sucked out of the canister. Therefore, the cartridges must be changed more often and usable ink is lost.

It is thus an object of the invention to provide an ink cartridge shelf which allows a clean and quick exchange of ink cartridges. Further, it should also ensure that the cartridges are emptied fully and as little ink residues as possible are left in the cartridges.

This object is solved by an ink cartridge receiving module having a plurality of receiving spaces for receiving a plurality of ink cartridges, each receiving space having a bottom surface which is inclined at an angle between 10° and 45° with respect to a horizontal plane, each receiving space further having a connector adapted for removing ink from the respective cartridge, the connectors being arranged at the lower side of the receiving spaces.

Major advantage of the inventive ink cartridge receiving module is that it allows to use almost all the ink which the cartridges contain. Therefore, every cartridge is almost completely empty and only contains minimal residues of ink.

The inclined bottom surface of each receiving space leads to the fact that ink cartridges which are inserted into a receiving space are inclined as well.

By introducing the ink cartridges in a way that the opening is facing the connector at the lower side of the receiving space, the ink inside the cartridge flows out by itself.

The mentioned angle of the inclined bottom surface in 10° and 45° with respect to a horizontal plane is arranged in such a way that all the ink flows towards the opening of the most types of ink cartridges.

The connector ensures that no ink or only a negligible amount leaks when the ink cartridges are inserted or removed.

According to one aspect, each receiving space is having lateral guidance surfaces which are located on two opposite sides of the bottom surface, to provide lateral guidance for ink cartridges.

The lateral guidance allows a controlled insertion of ink cartridges and keeps them in place once they reach their final position within the receiving space. Further, it supports the ink cartridges.

Preferably, each receiving space is having a horizontal introductory support surface which is arranged in the region of the upper side of the bottom surface.

The introductory support surface simplifies the process of inserting an ink cartridge.

Thereby, an ink cartridge can be placed lying on one of its sides on the introductory support surface and being inserted fully by pushing it slowly in the direction of the inclined bottom surface so that it slides over the bottom surface down towards the connector. This is particularly advantageous when heavy cartridges, e.g. of about 2 to 15 kg, in particular about 10 kg, are to be inserted.

According to one aspect, each receiving space has a stop surface which is arranged in the region of the lower side of the bottom surface and which is at least approximately perpendicular to the inclination plane of the bottom surface. The stop surface ensures that the ink cartridge has a defined position when inserted. Thus, the support surface prevents the ink cartridge from sliding too far down the bottom surface.

Preferably, at least one load sensor is associated with the receiving spaces to determine the weight of the ink cartridges. In this way, the filling level of the cartridges can be measured or at least estimated. Associated with this it can be detected when an ink cartridge is empty or about to become empty so that a full replacement ink cartridge can be provided on time.

According to one aspect, a scale is located under the bottom surface of the respective receiving surface. With regard to the advantages resulting from this, reference is made to the above explanations.

According to one aspect, the connector comprises a locking mechanism to lock an inserted ink cartridge in place. This ensures that the ink cartridges are firmly inserted in the connector and are secured against unintentional loosening.

Preferably, a release device is assigned to the connector to release locked ink cartridges.

The release device forms an easy and quick to operate mechanism, which is especially important in industrial applications.

A release device can be realized as a push or pull button whereas the actuation of the button leads to a loosening of the former locked ink cartridge.

Preferably, the connector is adapted to incorporate a cap of an ink cartridge which acts as an adapter from cartridge to connector.

The cap can be designed on the side facing the cartridge so that it is compatible with the opening of the cartridge and can be connected to it.

If the cartridge is a canister, then it is possible that the cap can be screwed on the opening of the canister in replacement of the lid which is screwed on the opening in the delivery state.

The side of the cap facing the connector only releases ink when being pushed into the connector so that leakage is excluded. This also applies when the cartridge is being removed from the connector allowing also a cleanly replacement.

According to one aspect, the connector is followed by a buffer for the collection of ink. The buffer keeps ink available for a printing process while an empty ink cartridge is being exchanged for a new and full cartridge. This ensures that there are no interruptions during the printing process because of shortage of ink.

Preferably, the buffer comprises a tank for holding ink, an intake in the tank for ink supplied from the ink cartridge, a level sensor to determine the ink level in the tank, an ink outlet and a buffer volume. Such a buffer design is simple and reliable and enables to track how much ink is left so that the time in which the ink cartridge has to be exchanged can be predicted.

Preferably, the ink cartridge receiving module comprises a bowl-shaped drip ink recovery area which extends at least partly underneath the receiving spaces. The bowl-shaped drip ink recovery area can collect ink in case it is being spilled so that the floor is not concerned by the spilled ink. Further, there is in case of ink spillage intermediate cleaning necessary as the drip ink recovery area is being made for collecting ink.

Preferably, the drip ink recovery area is designed as a drawer that can be pulled out from underneath the ink cartridge receiving module. This function simplifies the cleaning of the drip ink recovery area.

Further, the drip ink recovery area can have a drain valve to drain collected ink. The drain-collected ink can either be disposed or reused by filling it into an ink cartridge so that no ink is being wasted.

Features and advantages of the invention become apparent from the following description and the enclosed figures. In the figures.

Figure 3:
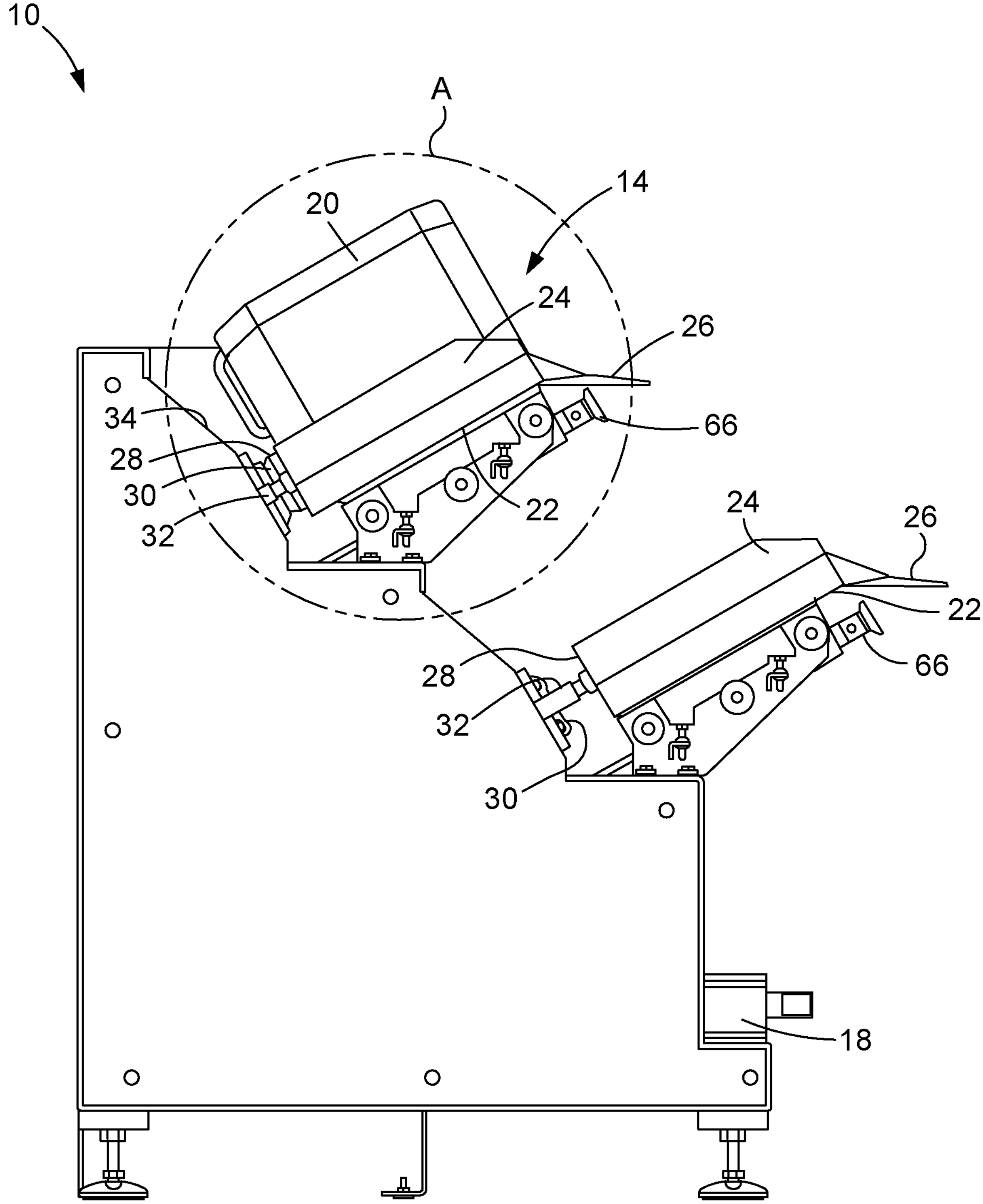
FIG. 3 shows the inventive ink cartridge receiving module from FIG. 2 in a side view.
Figure 4:
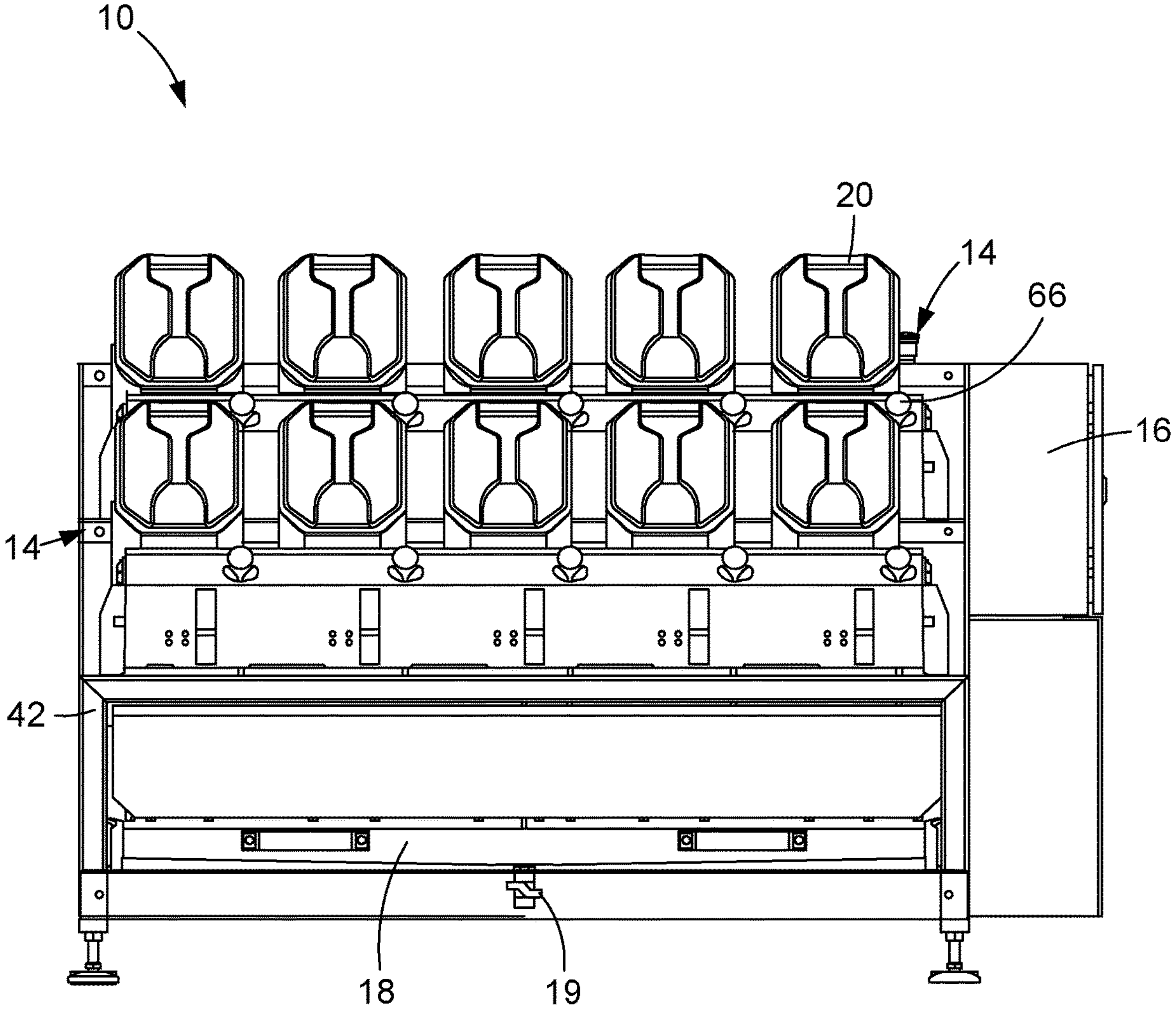
FIG. 4 shows the inventive ink cartridge receiving module from FIG. 2 in a front view.
Figure 11A:
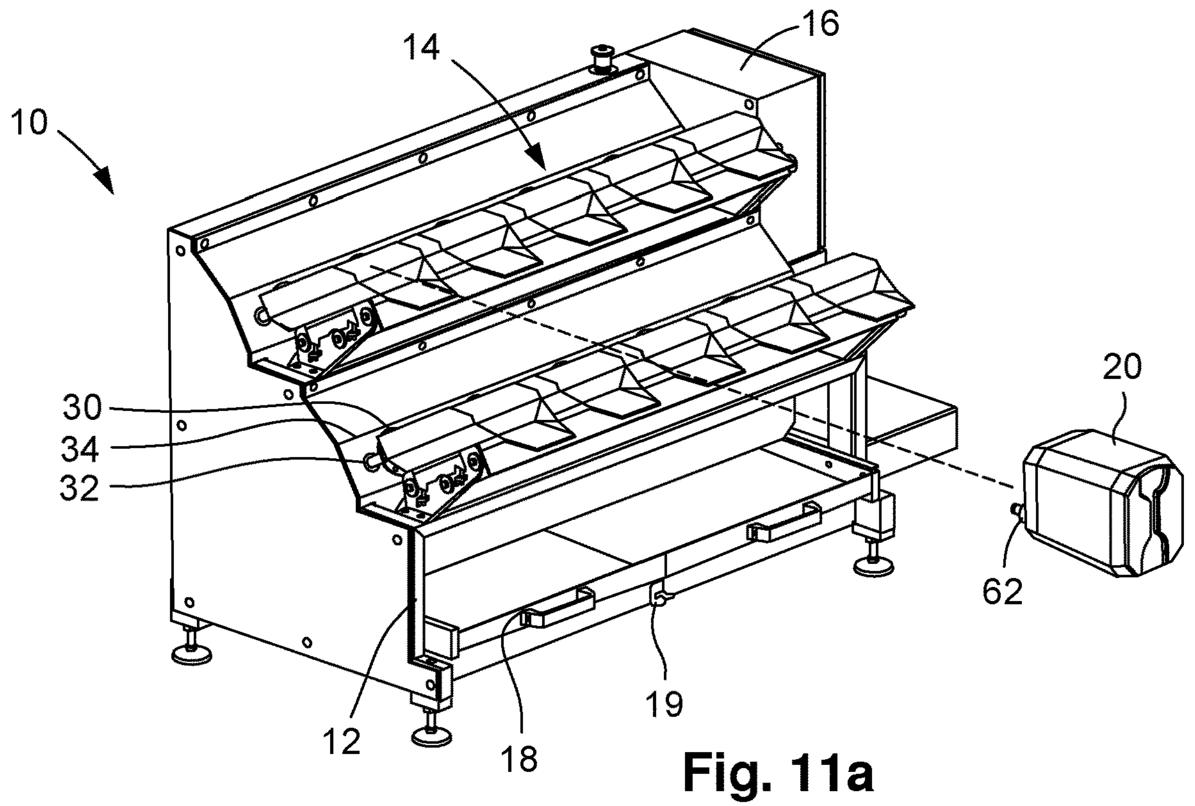
Figure 11B:
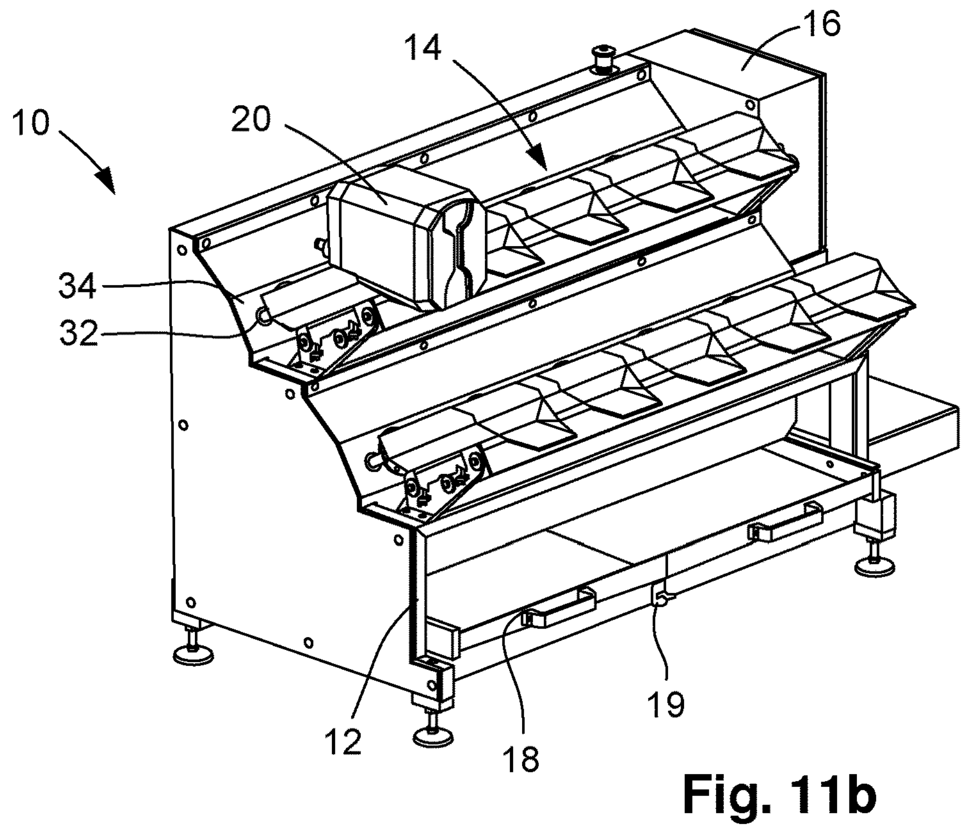
Figure 12:
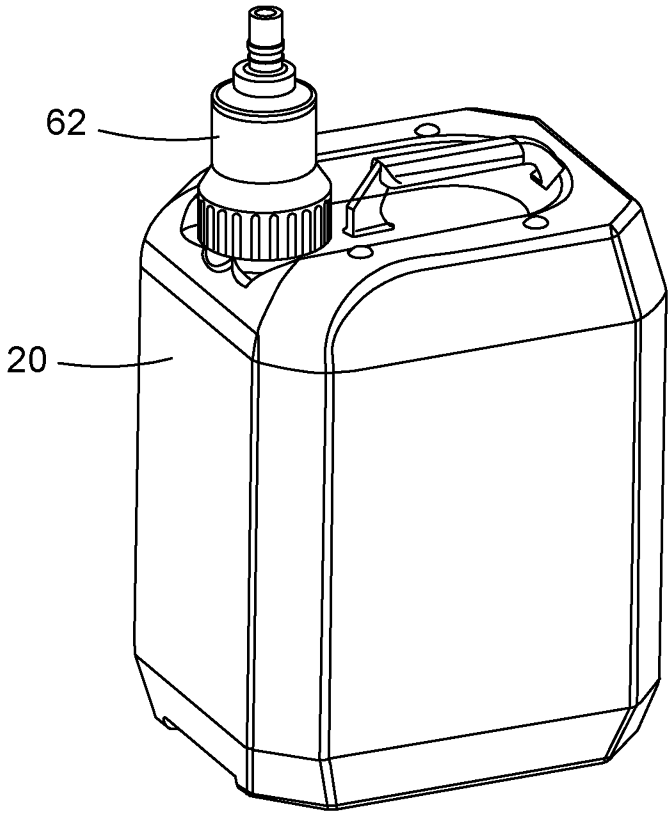
Figure 13:
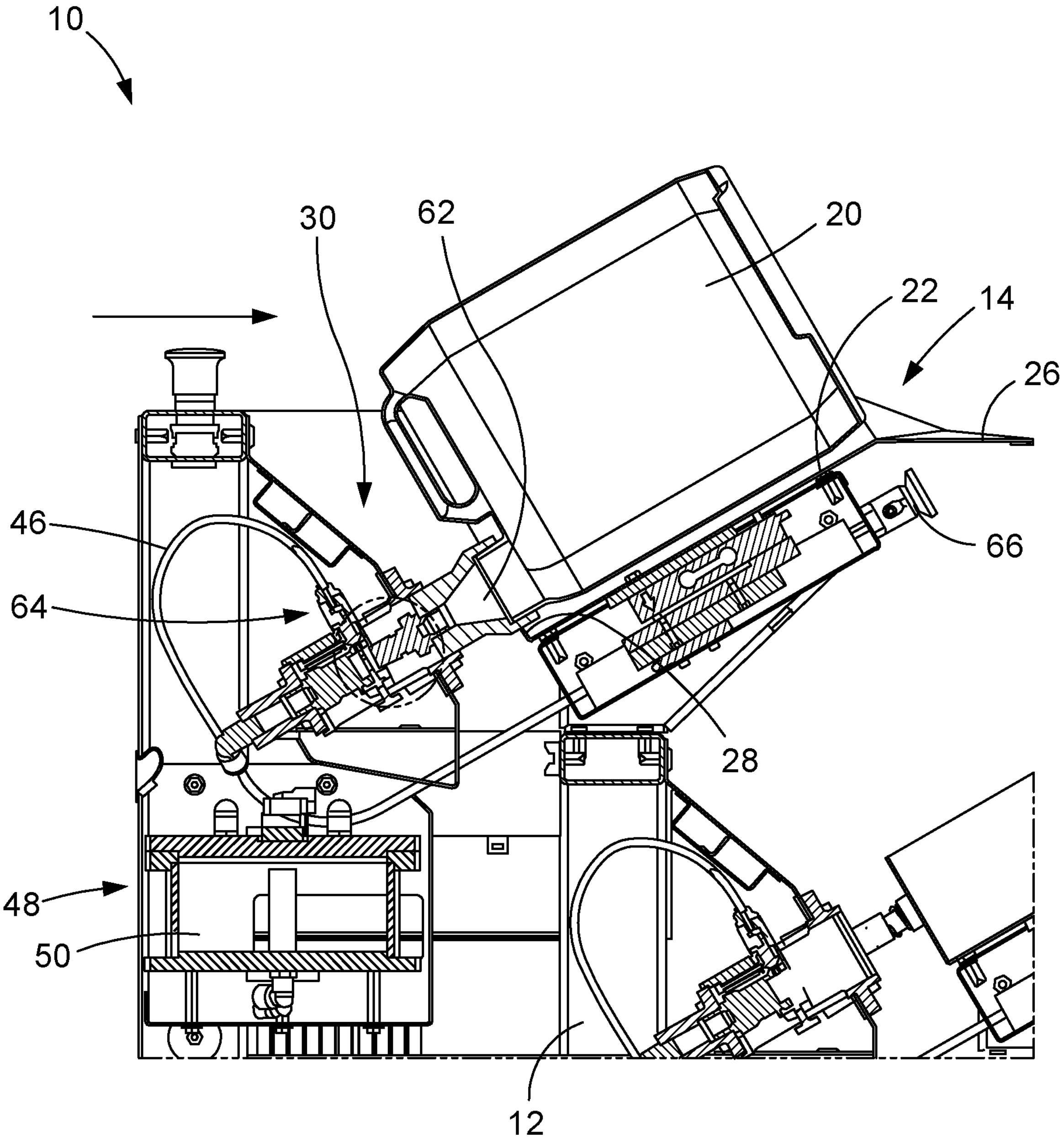
Figure 14:
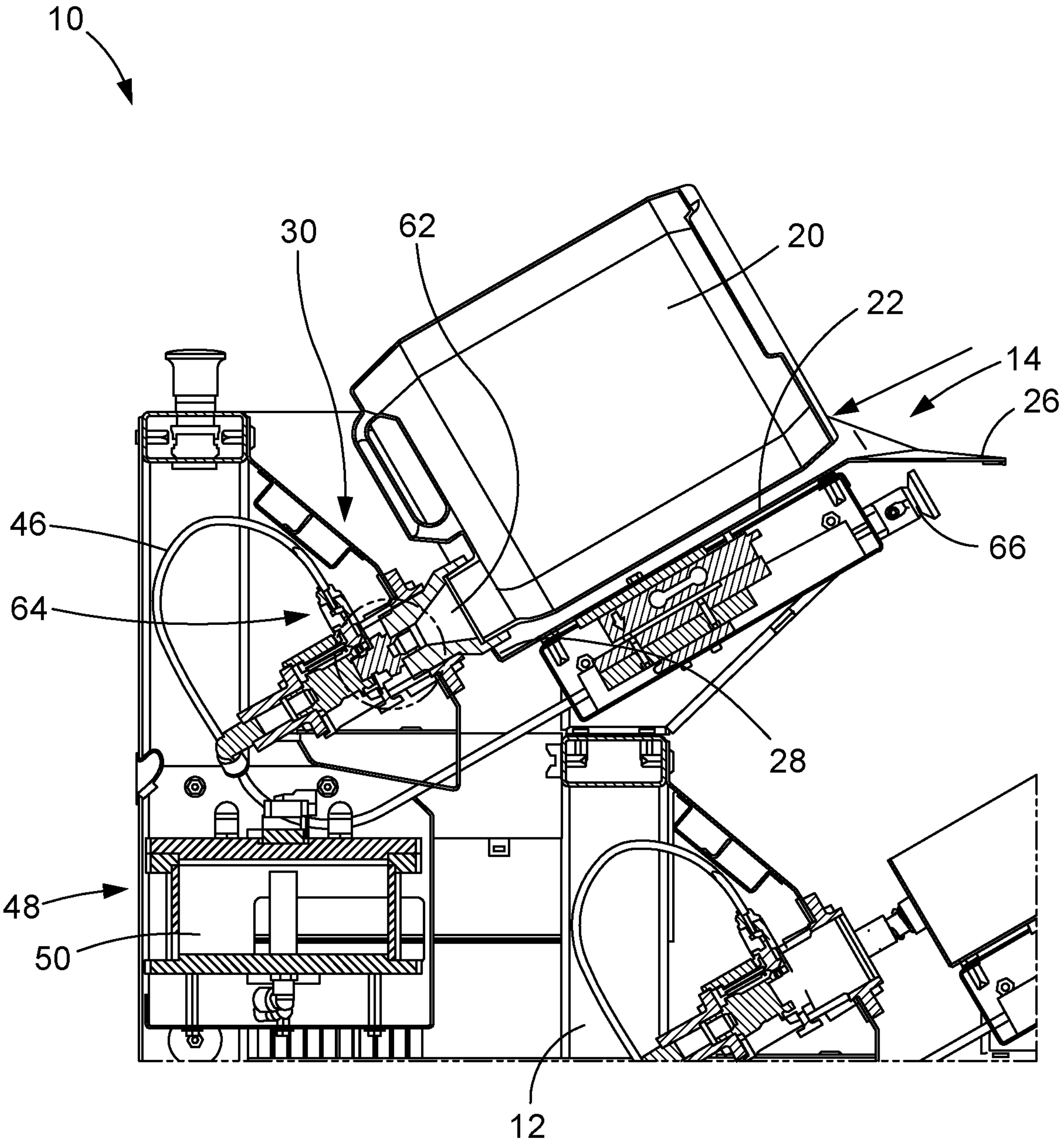

FIGS. 11*a* and 11*b* shows an inventive ink cartridge receiving module in a perspective view with a ink cartridge in different arrangements;

FIG. 12 shows a ink cartridge with a cap in a perspective view;

FIG. 13 shows a section of a cut-out A along the plane XIII-XIII of FIG. 3 with a ink cartridge partly introduced in the connector; and FIG. 14 shows a section of the cut-out A along the plane XIII-XIII of FIG. 3 with an ink cartridge locked in the connector.

Figure 1:
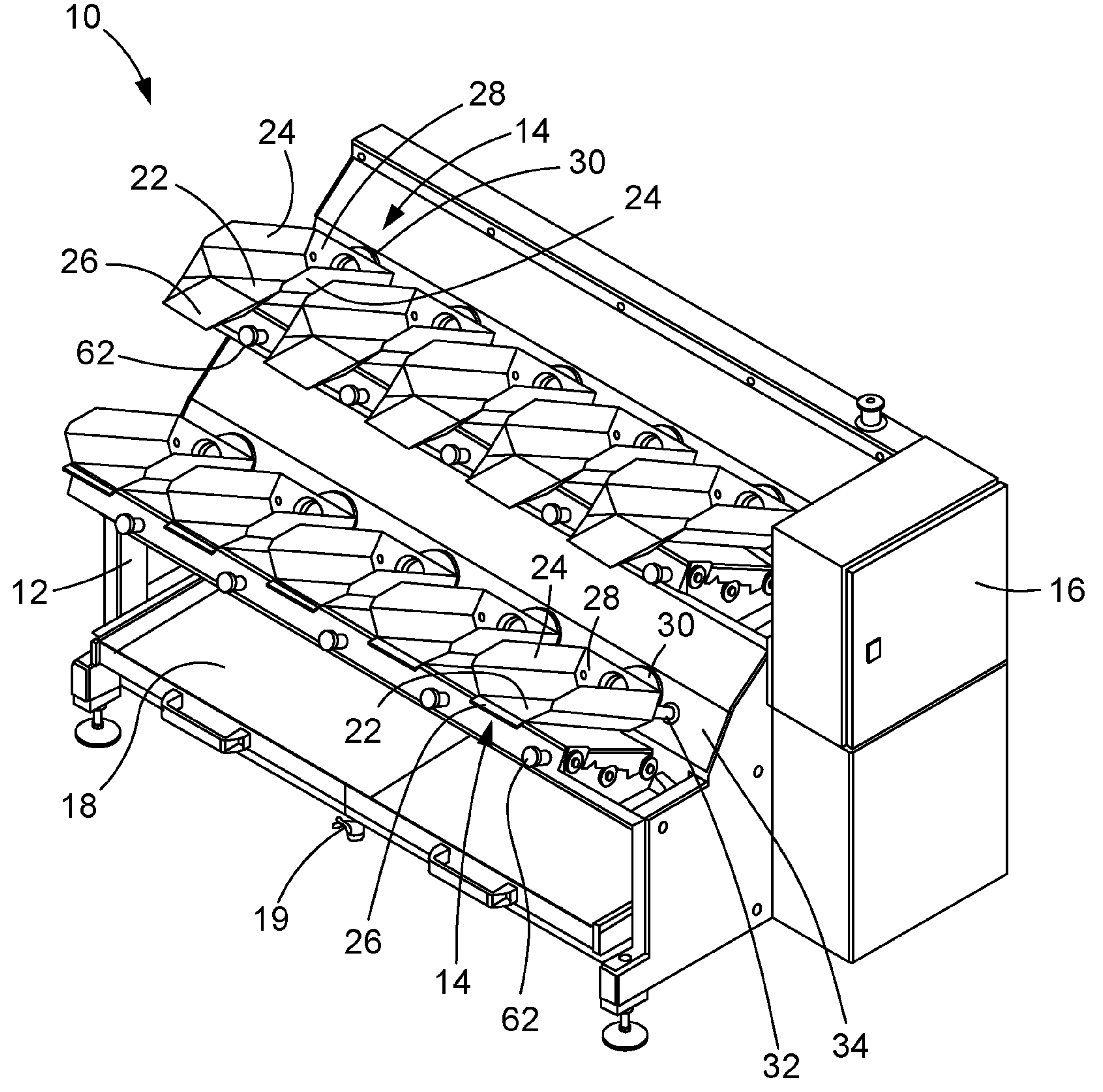
FIG. 1 shows an inventive ink cartridge receiving module in a perspective view.
Figure 2:
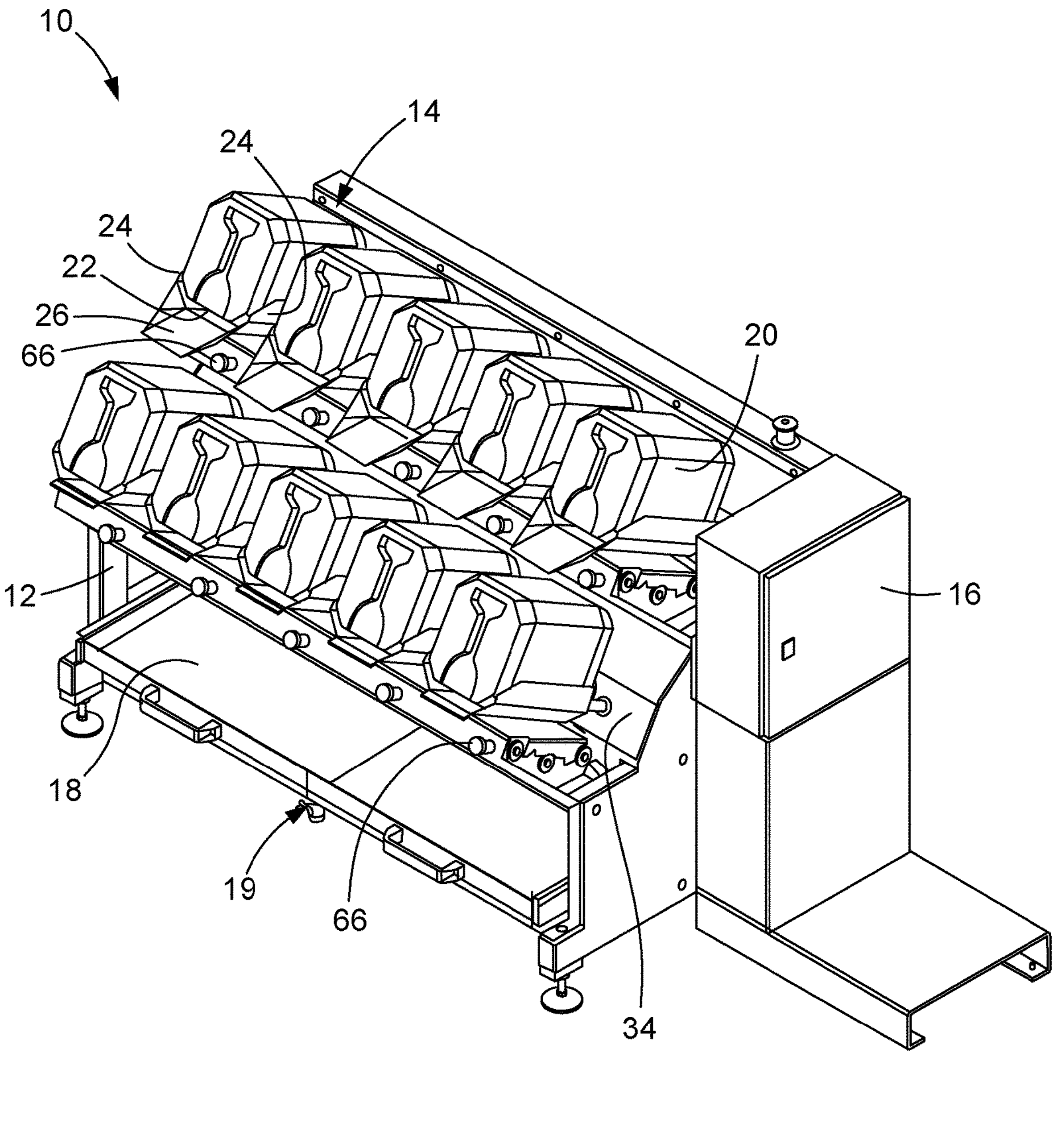
FIG. 2 shows the inventive ink cartridge receiving module in a perspective view loaded with ink cartridges.

FIG. 1 shows an ink cartridge receiving module 10 comprising a framework 12, a plurality of receiving spaces 14 which are arranged on the framework 12, and a control box 16 that accommodates the electrics, in particular a control system.

Module 10 is adapted for supplying ink to an industrial printing machine (not shown).

Ink cartridge receiving module 10 further comprises a ball-shaped drip ink recovery area 18 which is arranged at the framework 12 and which extends below the receiving spaces 14, is designed as a drawer that can be pulled out from underneath the ink cartridge receiving module 10 and has a drain valve 19 to drain collected ink.

FIGS. 2 to 6 show the ink cartridge receiving module 10 in different views whereby the receiving spaces 14 are equipped with ink cartridges 20.

The receiving spaces 14 are arranged in two rows stepwise on the framework 12. Each row comprises five receiving spaces 14 so that a total of ten receiving spaces 14 for receiving ink cartridges 20 are provided.

Of course, both the number of receiving spaces 14 and the number of rows can be varied according to the special requirements.

Figure 7:
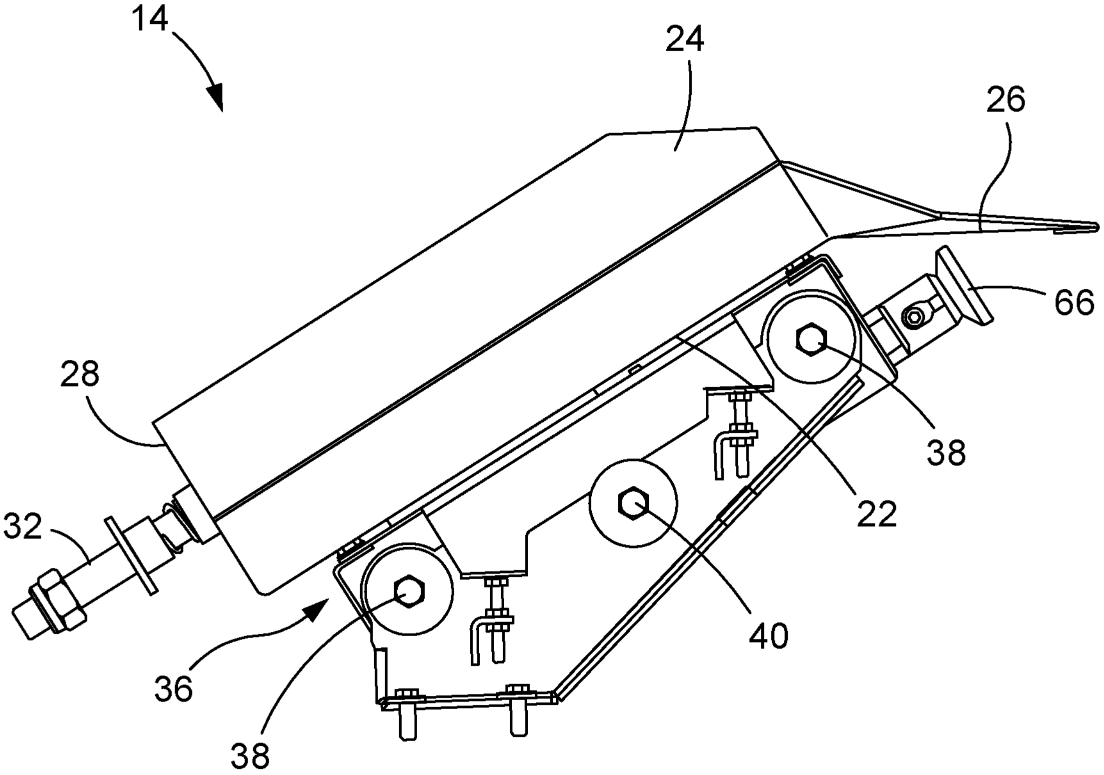
FIG. 7 shows a receiving space of the inventive ink cartridge receiving module in a side view.
Figure 8:
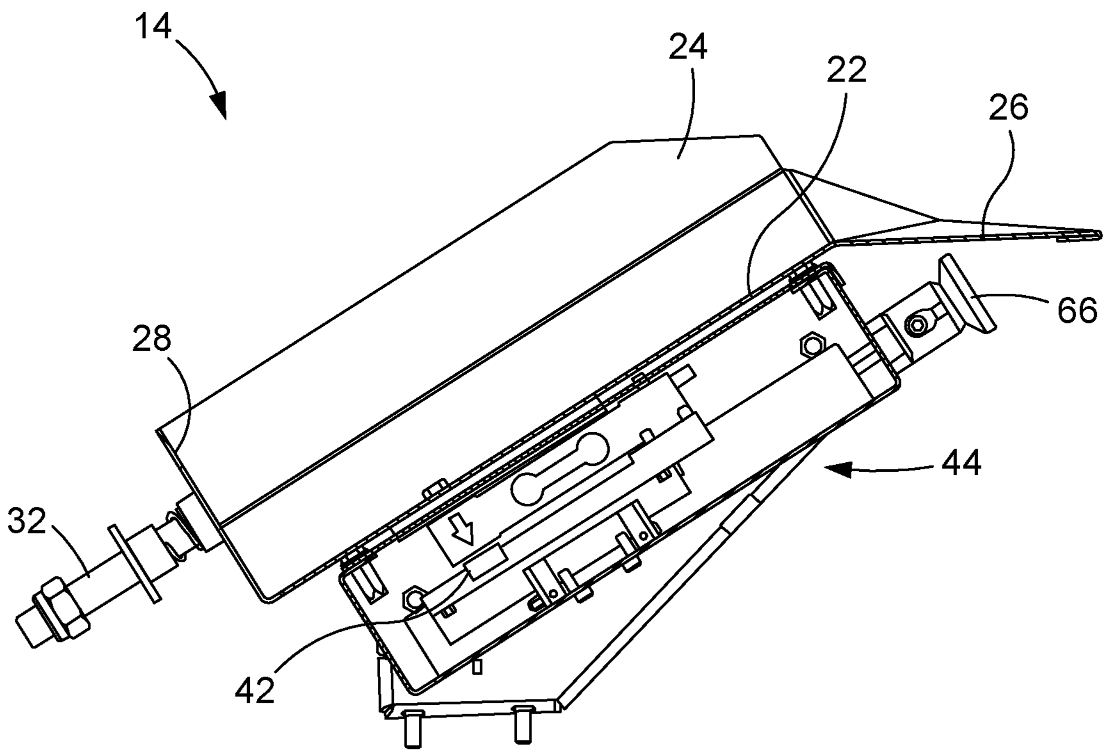
FIG. 8 shows a section along the plane VII-VII of FIG. 6.

Each receiving space 14 is having a bottom surface 22 which is inclined at an angle between 10° and 45° with respect to a horizontal (see also FIGS. 7 and 8 for detailed presentation of receiving spaces 14).

Further, lateral guidance surfaces 24 extend on two opposite sides of each bottom surface 22 to provide lateral guidance for the ink cartridges 20.

Additionally, horizontal introductory support surfaces 26 are provided for each receiving space 14. The horizontal introductory support surfaces 26 are arranged in the region of the upper side of the bottom surfaces 22, which extend in the direction of the ink cartridge receiving module to the front.

Furthermore, on the opposite side from which the horizontal introductory support surface 26 is extending from the bottom surface 22 there is a stop surface 28 provided which is approximately perpendicular to the inclination plane of the bottom surface 22.

In addition to the bottom surface 22 the stop surface 28 is also connected to the lateral guidance surface 24 on both sides.

Moreover, receiving space 14 comprises a connector 30 adapted for removing ink from the ink cartridges 20. The connector 30 is arranged at the lower side of each receiving space 14 in the region of the stop surface 28.

Furthermore, an adjustment mechanism 36 is provided with which the inclined bottom surface 22 can be adjusted vertically and according to another embodiment it could also be adjusted angularly.

For the angular adjustment two adjustment screws 38 are located beneath the bottom surface 22 with which the angle can be adjusted in a range from +/−4 degrees.

For the vertical setting an adjustment screw 40 is provided which allows a vertical adjustment of a receiving space 14 within a range of +/−5 mm (see especially FIG. 7).

To determine the weight of the ink cartridges which are being placed on each receiving space 14, load sensors 42 are associated with each receiving space 14.

Through the load sensors 42 a scale 44 can be realized which is right below the inclined bottom surface 22 of the receiving spaces 14 (see especially FIG. 8).

Figure 5:
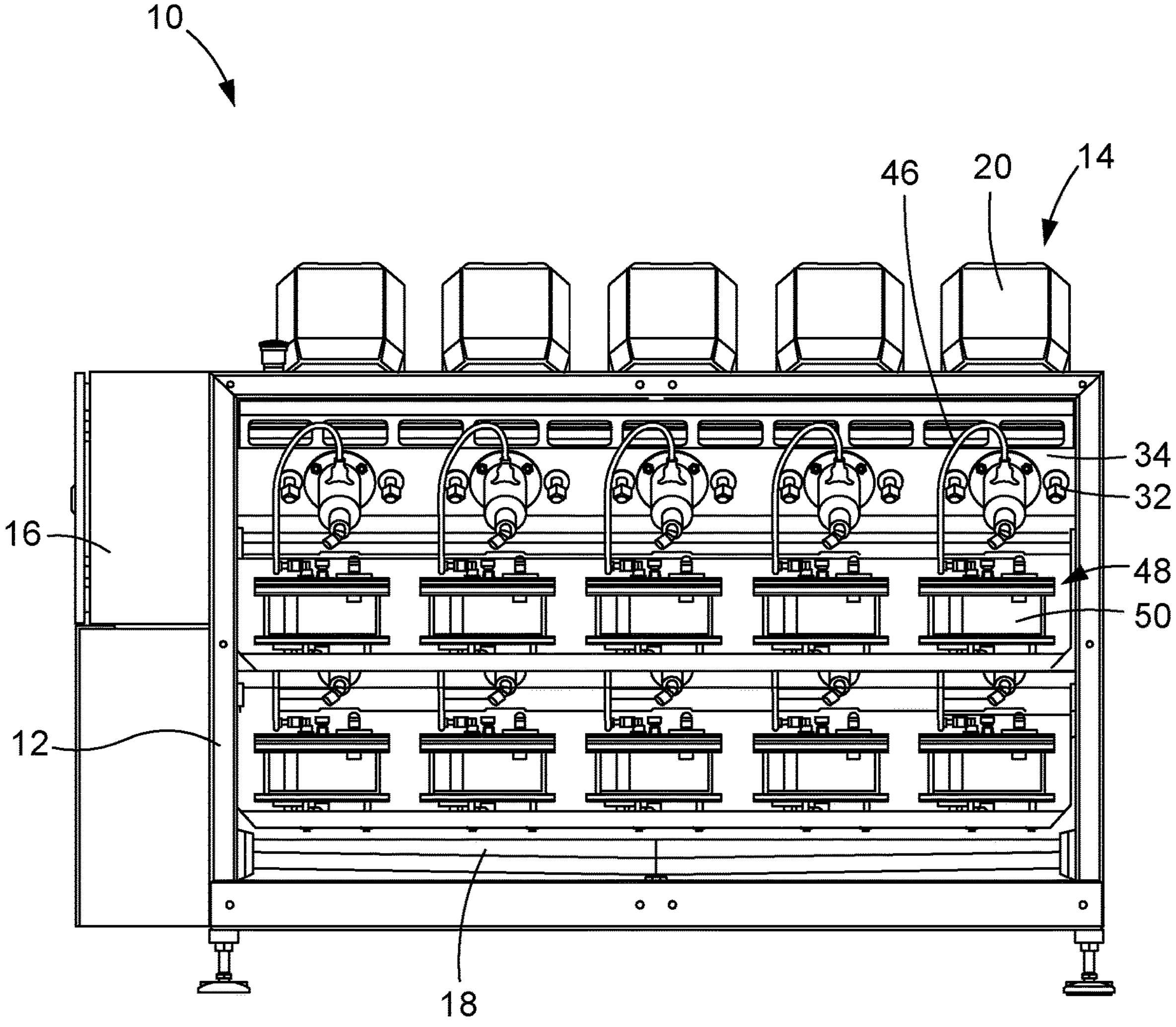
FIG. 5 shows the inventive ink cartridge receiving module from FIG. 2 in a rear view.
Figure 6:
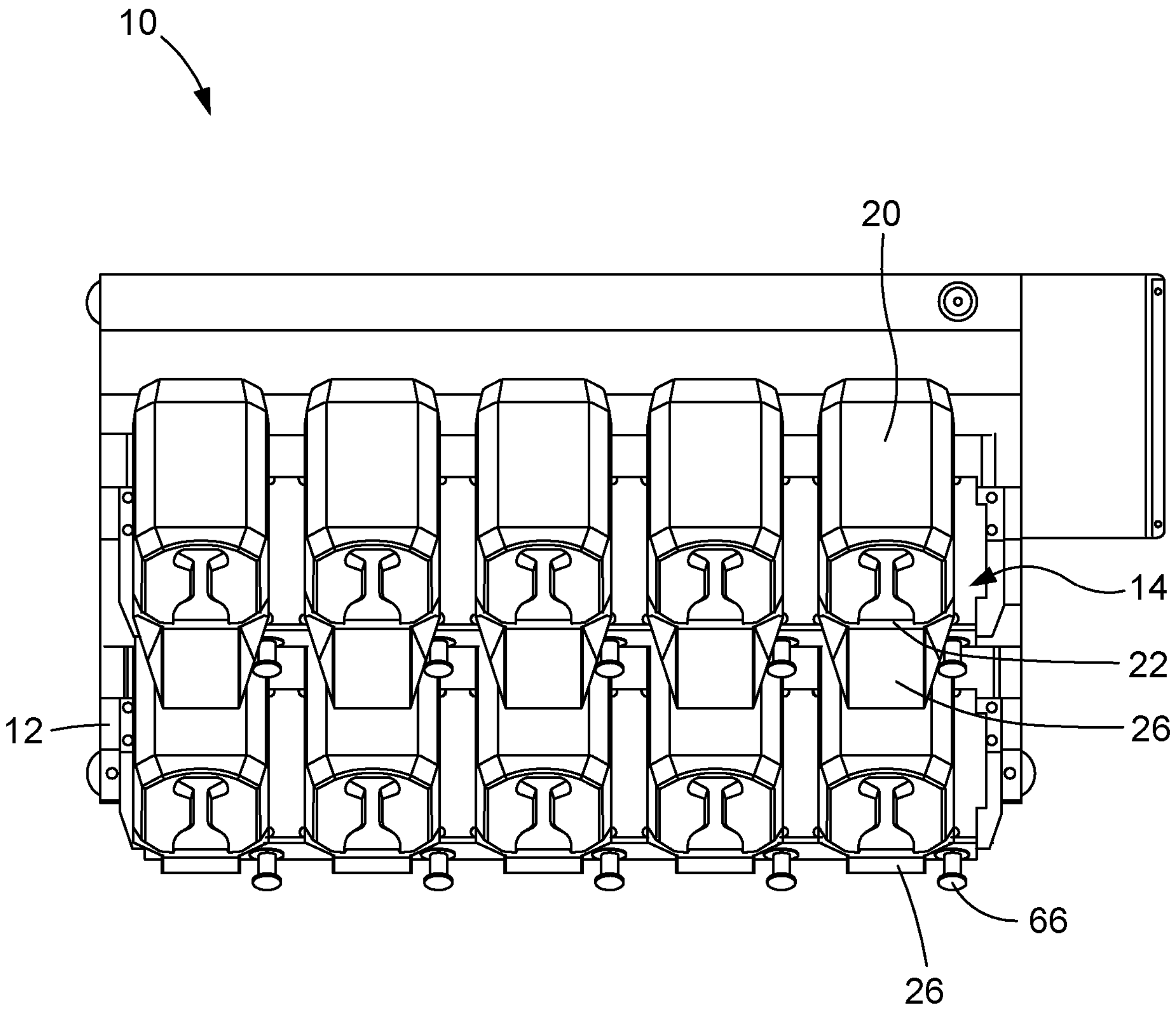
FIG. 6 shows the inventive ink cartridge receiving module from FIG. 2 in a top view.

From each connector 30 a cable 46 extends from the backside of the ink cartridge receiving module 10 by which the connector 30 is connected to a buffer 48 (see especially FIG. 5).

Figure 9:
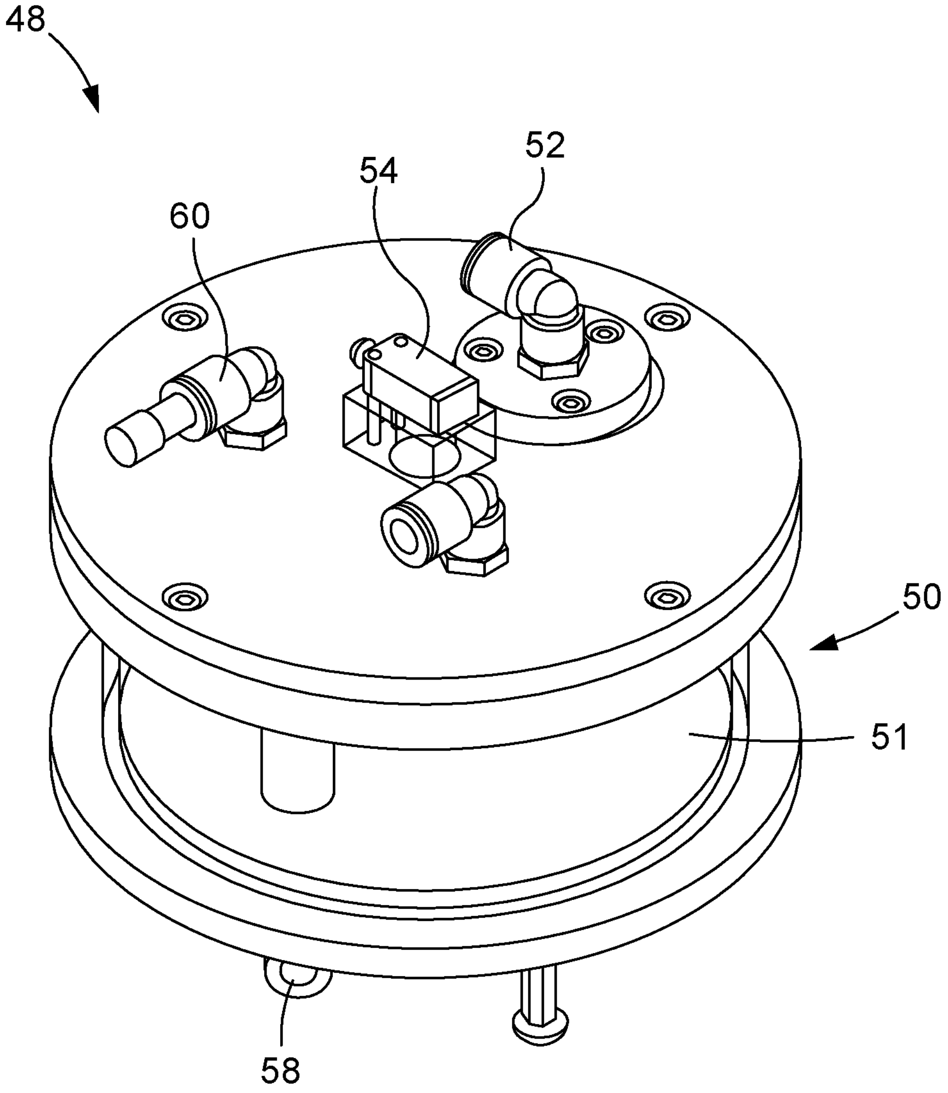
FIG. 9 shows a buffer of the inventive ink cartridge receiving module in a perspective view.
Figure 10:
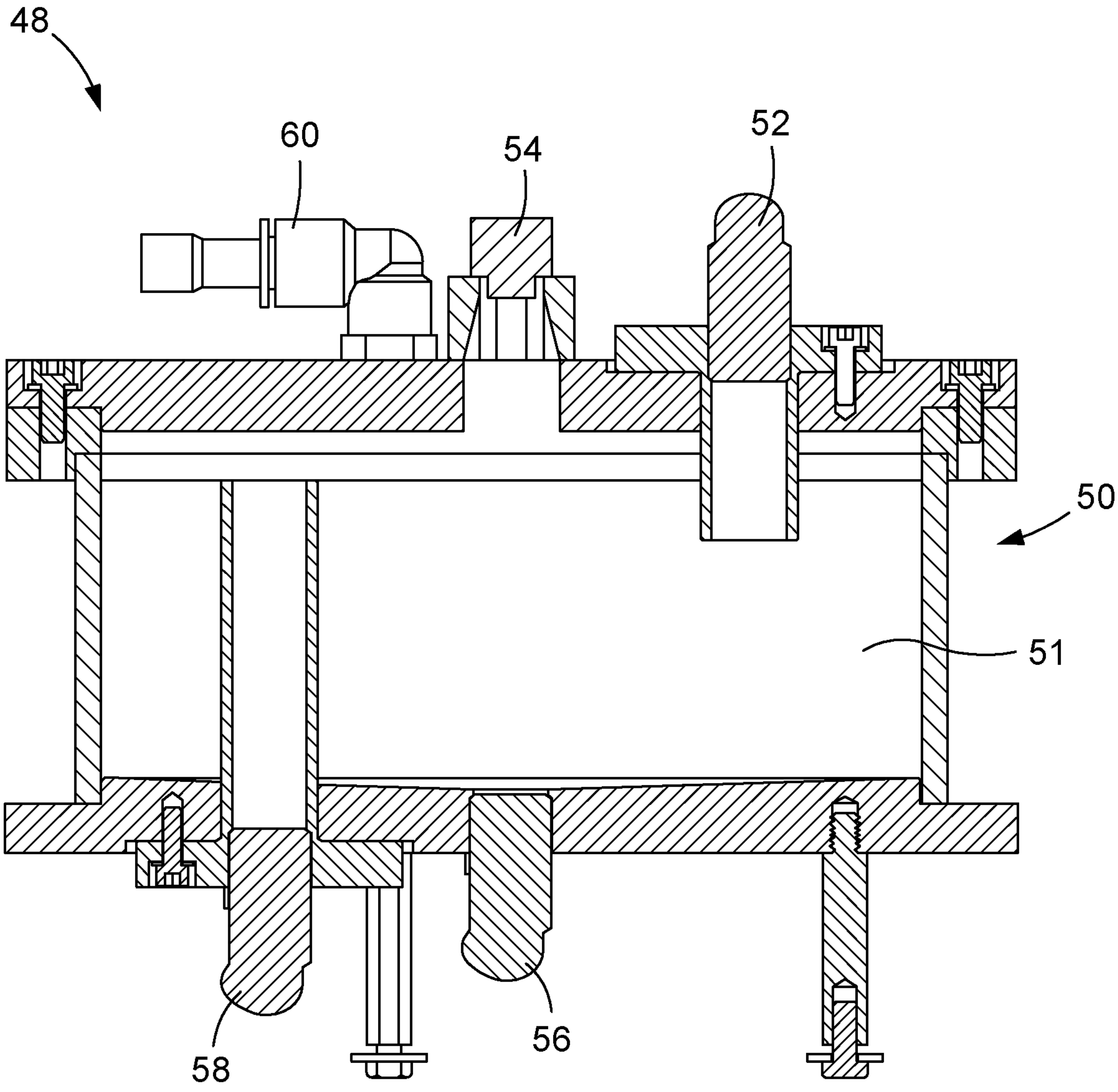
FIG. 10 shows a section along the plane X-X of FIG. 9.

The buffer 48, shown in detail in FIGS. 9 and 10, comprises a tank 50 for holding ink. The tank 50 of each buffer 48 has an intake 52, which is connected via the cable 46 to the respective ink cartridge 20.

A level sensor 54 determines the ink level in the tank 50.

An ink outlet 56 connected to a feeding tube supplies an ink supply connected to a cluster (not shown in the Figures) with ink.

From the ink supply and the cluster a return tube goes back to the buffer 48 via which redundant ink is being led back into the tank 50 through a return intake 58.

An air-inlet 60 ensures that the buffer 48 can be filled and emptied easily.

Based on the FIGS. 11A to 14, the principle of inserting the ink cartridges 20 and the functionality of the connector 30 are explained below.

Before inserting the ink cartridge 20 a cap 62 is applied on the opening which can be seen better in FIG. 12. The cap 62 acts as an adapter from the cartridge 20 to the connector 30.

In order to insert the ink cartridge 20 it is moved towards the ink cartridge receiving module 10 with its opening facing the ink cartridge receiving module 10 (see FIG. 11A).

In order to simplify the introduction of the ink cartridge 20, it can be first placed on its side on the horizontal introductory support surface 26 (see FIG. 11B).

In a next step, the ink cartridge 20 can be tilted so that it starts sliding down the inclined bottom surface 22 with its cap 62 pointing down. Hereby it is being led laterally by the lateral guidance surfaces 24.

The ink cartridge 20 reaches its final position as soon as it is in contact with the stop surface 28 so that cap 62 is fully introduced to the connector 30 (see FIG. 13).

By further pushing the ink cartridge 20 towards the connector 30, a locking mechanism 64 is being activated by which the inserted ink cartridge is locked into place.

With the activated locking mechanism 64, ink can be extracted out of the ink cartridge 20 via the end of the cap 62 (see FIG. 14).

During the printing process the fill level of the ink cartridge 20 can be detected with the scale 44 via the load sensor 42.

Is the ink cartridge 20 about to be empty, it can be exchanged by deactivating the locking mechanism 64 so that it returns to an unlocking position as shown in FIG. 13 to enable an exchange of the ink cartridge 20.

In order to deactivate the locking mechanism 64 of the connector 30, a release device 66 is assigned to the connector 30 to release locked ink cartridges 20 when it is being pulled.

The locking mechanism 64 goes back into the position as shown in FIG. 13 and the empty ink cartridge 20 can be exchanged by a new ink cartridge.

While no ink cartridge 20 is connected to the connector 30 the ink left in the tank 50 of the buffer 48 is being used, so that the printing process can be continued for a certain time without a ink cartridge 20.

The invention claimed is:

1. An ink cartridge receiving module comprising:

a plurality of receiving spaces for receiving a plurality of ink cartridges, each receiving space of the plurality of receiving spaces having a bottom surface which is inclined at an angle between 10° and 45° with respect to a horizontal plane, each receiving space further having a connector adapted for removing ink from a respective cartridge of the plurality of ink cartridges, the connector being arranged at a lower side of each receiving space, and each receiving space further having a stop surface which is arranged in a region of the lower side of the bottom surface to contact the respective cartridge to stop the respective cartridge from further entry into the receiving space, wherein the stop surface extends from the bottom surface towards the connector.

2. The ink cartridge receiving module according to claim 1, wherein each receiving space includes lateral guidance surfaces which are located on two opposing sides of the bottom surface, to provide lateral guidance for the plurality of ink cartridges.

3. The ink cartridge receiving module according to claim 1, wherein each receiving space includes a horizontal introductory support surface which is arranged in a region of an upper side of the bottom surface.

4. The ink cartridge receiving module according to claim 1, wherein the stop surface contacts one of the plurality of ink cartridges when the one of the plurality of ink cartridges is in a final position.

5. The ink cartridge receiving module according to claim 1, further comprising:

at least one load sensor associated with the receiving spaces to determine a weight of the ink cartridges.

6. The ink cartridge receiving module according to claim 1, further comprising:

a scale located under the bottom surface of the respective receiving space.

7. The ink cartridge receiving module according to claim 1, wherein the connector comprises a locking mechanism to lock an inserted ink cartridge in place.

8. The ink cartridge receiving module according to claim 1, further comprising:

a release device assigned to the connector to release locked ink cartridges.

9. The ink cartridge receiving module according to claim 1, wherein the connector is adapted to incorporate a cap of an ink cartridge which acts as an adapter from cartridge to connector.

10. The ink cartridge receiving module according to claim 1, wherein the connector is followed by a buffer for collection of ink.

11. The ink cartridge receiving module according to claim 10, wherein the buffer comprises a tank for holding ink, an intake in the tank for ink supplied from the ink cartridge, a level sensor to determine the ink level in the tank, an ink outlet, and a buffer volume.

12. The ink cartridge receiving module according to claim 1, wherein the ink cartridge receiving module comprises a bowl-shaped drip ink recovery area which extends at least partly underneath the receiving spaces.

13. The ink cartridge receiving module according to claim 12, wherein the drip ink recovery area is designed as a drawer that can be pulled out from underneath the ink cartridge receiving module.

14. The ink cartridge receiving module according to claim 13, wherein the drip ink recovery area has a drain valve to drain collected ink.

15. An ink cartridge receiving module comprising:

a plurality of receiving spaces for receiving a plurality of ink cartridges, each of the plurality of receiving spaces including:

a bottom surface inclined at an angle between 10° and 45° with respect to a horizontal plane;

a connector adapted for removing ink from a respective ink cartridge of the plurality of ink cartridges, the connector being arranged at a lower side of each receiving space; and a stop surface extending from the bottom surface towards the connector, the stop surface provided to contact a respective cartridge to stop the respective cartridge from further entry into the receiving space; and a plurality of buffers, each buffer connected by a cable to the connector of a respective receiving space of the plurality of receiving spaces, and each buffer connected by a feeding tube and a return tube to an ink supply.

* * * * *